(12) United States Patent
Jones

(10) Patent No.: US 6,323,442 B1
(45) Date of Patent: Nov. 27, 2001

(54) SYSTEM AND METHOD FOR MEASURING WEIGHT OF DEPOSIT ON BOILER SUPERHEATERS

(75) Inventor: Andrew K. Jones, Cincinnati, OH (US)

(73) Assignee: International Paper Company, Stamford, CT (US)

( * ) Notice: Subject to any disclaimer, the term of this patent is extended or adjusted under 35 U.S.C. 154(b) by 0 days.

(21) Appl. No.: 09/456,192

(22) Filed: Dec. 7, 1999

(51) Int. Cl.[7] ............................. G01G 19/52; F22B 37/48
(52) U.S. Cl. .................... 177/132; 177/142; 177/245; 122/379; 122/392
(58) Field of Search .................. 177/210 R, 211, 177/245, 132, 142; 122/379, 392

(56) References Cited

U.S. PATENT DOCUMENTS

| | | | |
|---|---|---|---|
| 4,004,647 | * 1/1977 | Forst et al. ........................... | 177/132 |
| 4,037,469 | * 7/1977 | Nordstrom et al. .................. | 177/245 |
| 4,454,840 | * 6/1984 | Dziubakowski ..................... | 122/390 |
| 4,475,482 | * 10/1984 | Moss et al. .......................... | 122/379 |
| 4,488,516 | * 12/1984 | Bueters et al. ...................... | 122/379 |
| 4,539,840 | * 9/1985 | Klatt et al. .......................... | 122/390 |
| 4,718,376 | * 1/1988 | Leroueil et al. ..................... | 122/390 |
| 4,779,690 | * 10/1988 | Woodman ........................... | 177/132 |
| 4,986,391 | * 1/1991 | Salmon ............................... | 177/132 |
| 5,181,482 | * 1/1993 | Labbe et al. ........................ | 122/392 |
| 5,348,774 | * 9/1994 | Golecki et al. ..................... | 177/245 |

* cited by examiner

*Primary Examiner*—Randy W. Gibson

(57) ABSTRACT

A method and system for measuring a weight of a deposit that forms on a tube bank independently-suspended by one or more hanger rods within a boiler are characterized by having one or more strain sensors, with each strain sensor affixed to a separate hanger rod. The strain sensors are connected to a logic circuit for reading strain readings from the strain sensors and calculating the weight of the deposit as a function of the strain readings.

16 Claims, 5 Drawing Sheets

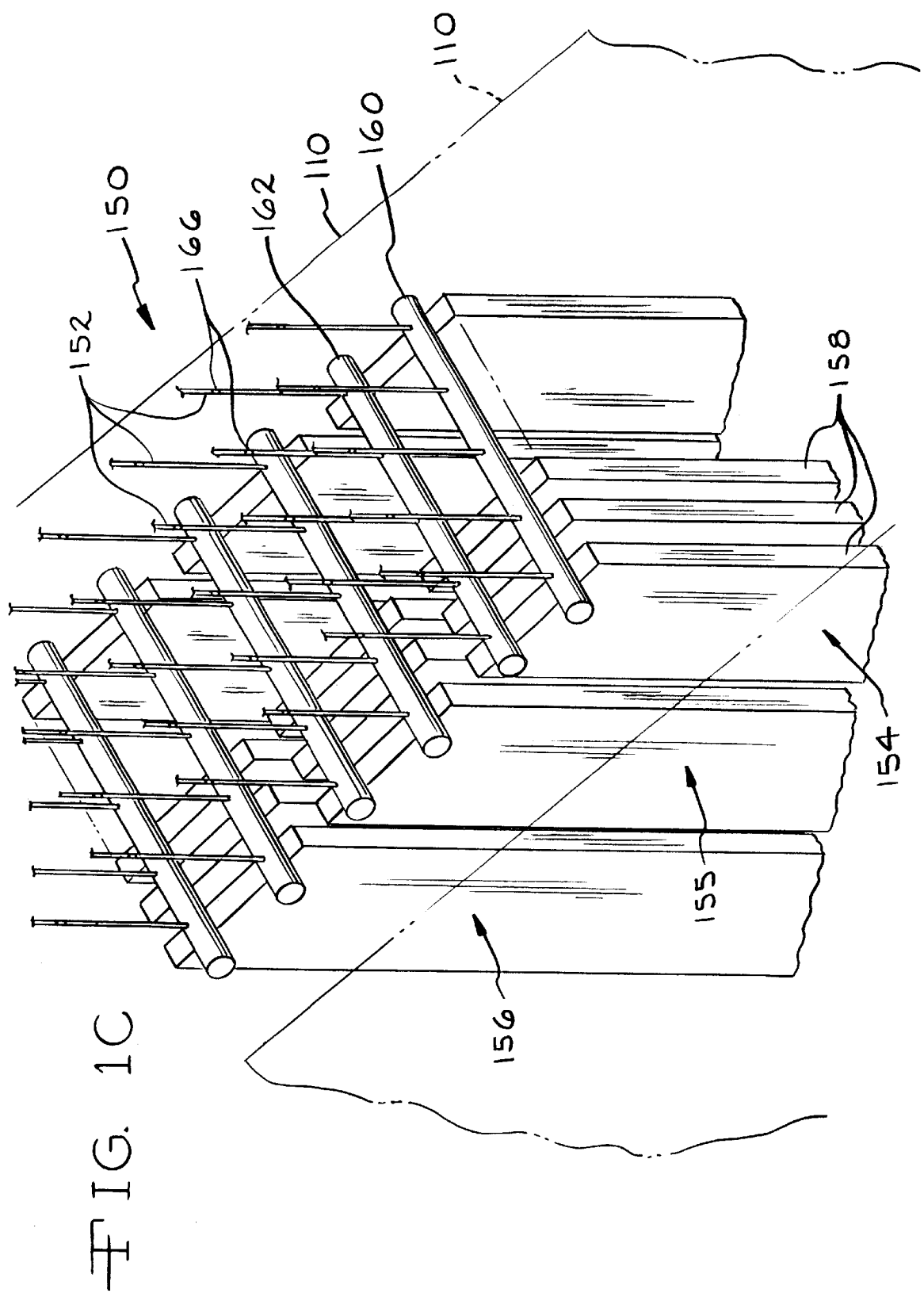

SYSTEM AND METHOD FOR MEASURING WEIGHT OF DEPOSIT ON BOILER SUPERHEATERS

TECHNICAL FIELD

The present invention relates to recovery boilers and in particular to a method and apparatus for measuring the amount of fouling (ash buildup) on the superheaters of the recovery boilers used with the kraft pulping process.

BACKGROUND OF THE INVENTION

In the paper-making process, chemical pulping yields, as a by-product, black liquor, which contains almost all of the inorganic cooking chemicals along with the lignin and other organic matter separated from the wood during pulping in a digester. The black liquor is burned in a recovery boiler. The two main functions of the recovery boiler are to recover the inorganic cooking chemicals used in the pulping process and to make use of the chemical energy in the organic portion of the black liquor to generate steam for a paper mill. The twin objectives of recovering both chemicals and energy make recovery boiler design and operation very complex.

In a kraft recovery boiler, superheaters are placed in the upper furnace in order to extract heat by radiation and convection from the furnace gases. Saturated steam enters the superheater section, and superheated steam exits at a controlled temperature. The superheater is constructed of an array of tube panels. The superheater surface is continually being fouled by ash that is being carried out of the furnace chamber. The amount of black liquor that can be burned in a kraft recovery boiler is often limited by the rate and extent of fouling on the surfaces of the superheater. This fouling reduces the heat absorbed from the liquor combustion, resulting in low exit steam temperatures from the superheaters and high gas temperatures entering the boiler. Boiler shutdown for cleaning is required when either the exit steam temperature is too low for use in downstream equipment or the temperature entering the boiler bank exceeds the melting temperature of the deposits, resulting in gas side pluggage of the boiler bank. Kraft recovery boilers are particularly prone to the problem of superheater fouling, due to the high quantity of ash in the fuel (typically more than 35%) and the low melting temperature of the ash.

There are three conventional methods of removing deposits from the superheaters in kraft recovery boilers, listed in increasing order of required down-time and decreasing order of frequency: 1) sootblowing; 2) chill-and-blow; and 3) waterwashing.

Sootblowing is the process of blowing ash deposit off the superheater with a blast of steam from nozzles called sootblowers. Sootblowing occurs essentially continuously during normal boiler operation, with different sootblowers turned on at different times. Sootblowing reduces boiler efficiency, since 5–10% of the boiler's steam is typically used for sootblowing. Each sootblowing operation reduces a portion of the nearby ash deposit, but the ash deposit nevertheless continues to build up over time. As the deposit grows, sootblowing becomes gradually less effective and results in impairment of the heat transfer.

When the ash deposit reaches a certain threshold where boiler efficiency is significantly reduced and sootblowing is insufficiently effective, deposits must be removed by the second cleaning process called "chill-and-blow"(also called "dry cleaning" because water is not used), requiring the partial or complete cessation of fuel firing in the boiler for typically 4–12 hours, but not complete boiler shutdown. During this time, the sootblowers continuously operate to cause the deposits to debond from the superheater sections and fall to the floor of the boiler. This procedure may be performed as often as every month, but the frequency can be reduced if the sootblowing is performed optimally (at the optimum schedule and in the optimum sequence). As with sootblowing, the chill-and-blow procedure reduces a portion of the nearby ash deposit, but the ash deposit nevertheless continues to grow over time. As the deposit grows, the chill-and-blow procedure becomes gradually less effective and must be performed more often.

The third cleaning process, waterwashing, entails complete boiler shutdown for typically two days, causing significant loss in pulping capacity at a mill. In a heavily fouled recovery boiler, it may be required every four months, but if the chill-and-blow process is properly timed (i.e. before large deposits form in the boiler bank section), then the shutdown and waterwashing can be avoided for even a year or longer.

In determining the optimum frequency, or time, to implement each cleaning process, there is a calculated tradeoff. Boiler deposits reduce pulping capacity through boiler efficiency, but removing those deposits through waterwashing temporarily reduces pulping capacity much more. Hence, there is an optimum frequency, or timing, for the waterwashing process, and doing it too often or too rarely is financially costly.

Similarly, there is an optimum frequency, or time, to implement the chill-and-blow cleaning process, based on the amount of deposit and the rate of fouling of the superheaters. Applying chill-and-blow too often unnecessarily increases down-time, and applying it too rarely increases the need for a complete shutdown and waterwashing. Therefore, more precision in timing the chill-and-blow process greatly increases boiler efficiency, with large financial and environmental benefits. A similar tradeoff applies to the sootblowing.

This tradeoff of economic considerations is discussed in U.S. Pat. No. 4,475,482, which describes a method for predicting the optimum cycle time to schedule sootblowing, based on economic criteria which account for heat transfer surface fouling, rate of fouling of other heat transfer surfaces within the boiler, and on-line boiler incremental steam cost.

The prior art methods of determining the amount of deposit on superheater sections of kraft recovery boilers, or the timing of cleaning, are based on indirect measurements, such as the temperature increase of gas exiting the boiler, the temperature decrease of steam, heat transfer, enthalpy, or the pressure drop increase over the gas side (combustion section as opposed to the water/steam side) of the boiler. The following patents disclose methods to assess the timing and efficacy of removing ash deposit by measuring factors affected by the deposit, but not by measuring the deposit weight. U.S. Pat. Nos. 4,454,840 and 4,539,840 disclose a method of identifying a parameter of a model for rate of loss of fossil fuel boiler efficiency due to a sootblowing operation, based on time since a last sootblowing in a heat transfer surface (convection-pass surface such as superheater and economizer) in question, overall boiler efficiency at the beginning of the sootblowing, and change in efficiency due to the sootblowing.

U.S. Pat. No. 4,718,376 discloses a method for controlling sootblowing in a chemical recovery boiler, entailing (column 4, line 27) instrumentation that indicates the change in heat transfer characteristics over time due to fouling, such as by measuring the change in flue gas temperature and pressure drop across the tube bank and change in enthalpy of water or steam in the tube bank. Alternatively, (column 4, line 47) the instrumentation is related to changes in boiler operating characteristics over time, such as steam rate, feed water rate, fuel firing rate or change in flue gas composition.

U.S Pat. No. 4,488,516 discloses a soot blower system for a fossil fuel fired steam generator comprising soot blowers selectively operable to clean ash from furnace chamber walls in direct response to the local heat transfer rate sensed by heat flux meters mounted to the furnace wall in the region surrounding each soot blower.

The prior art techniques each have one or more of the following problems: 1) They require the use of expensive and/or delicate equipment which can require recalibration. 2) They are affected by many boiler parameters (such as boiler load), and mathematical corrections for these interfering parameters are not precise. 3) They cannot be used when the boiler is partially or fully shut down for cleaning. 4) Some methods require complex formulas and parameters that are difficult for a common boiler operator to perform and understand.

The deposit weight, the optimum time for applying a cleaning process, and the effectiveness of the cleaning process displayed in real-time could be determined much more precisely if the weight of superheater deposit were measured directly.

SUMMARY OF THE INVENTION

It is an aspect of the present invention to provide a system and method as defined in one or more of the appended claims, and, as such, having the capability of accomplishing one or more of the following subsidiary aspects.

An aspect of the present invention is to provide an apparatus and method for directly measuring the amount of superheater deposit in a kraft recovery boiler.

Another aspect of the present invention is to provide an apparatus and method for determining the optimum timing for applying the chill-and-blow process and waterwashing process.

Another aspect of the present invention is to provide an apparatus and method for aiding a boiler operator during a cleaning operation to determine the optimum procedure and duration for cleaning.

The present invention relates to a method and system for measuring a weight of a deposit that forms on a tube bank that is independently-suspended by one or more hanger rods within a boiler (such as a kraft recovery boiler). The system is characterized by having one or more strain sensors (such as strain gages), with each strain sensor being affixed to a separate hanger rod. The number of strain sensors can be the same or less than the number of hanger rods. The strain sensors are connected to a logic circuit for reading strain readings from the strain sensors and calculating the weight of the deposit as a function of the strain readings.

The method or system can include one or more temperature sensors, each being affixed to a separate hanger rod close to a strain sensor and electrically connected to the logic circuit. The logic circuit uses temperature readings from the temperature sensors to mathematically correct the strain readings for temperature effects.

The logic circuit calculates the weight of the deposit as the sum of the strain readings currently obtained from the strain sensors minus the sum of the strain readings obtained from the strain sensors just after a previous washdown, all multiplied by a calibration factor. The logic circuit then calculates a cleaning index which equals the weight of the deposit divided by a predetermined threshold weight. The logic circuit displays the weight of the deposit and and the cleaning index.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

The same element appearing in different figures is usually given the same reference number in all figures.

In a single drawing, similar elements may be assigned the same number.

For illustrative clarity, the cross-sectional views presented herein may be in the form of "near-sighted" cross-sectional views, omitting certain background lines that would otherwise be visible in a true cross-sectional view.

Figure 1A:
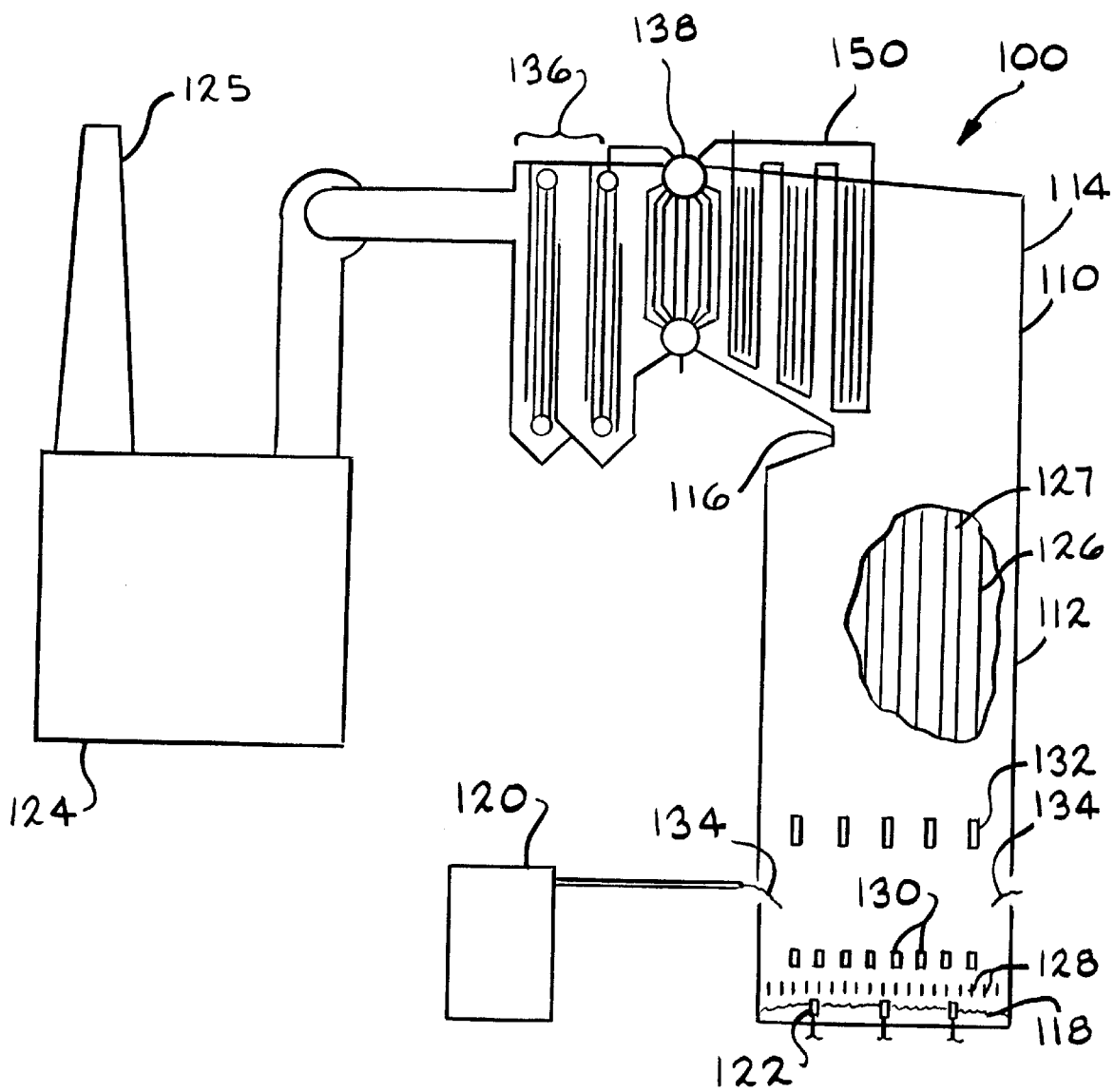
Figure 1B:
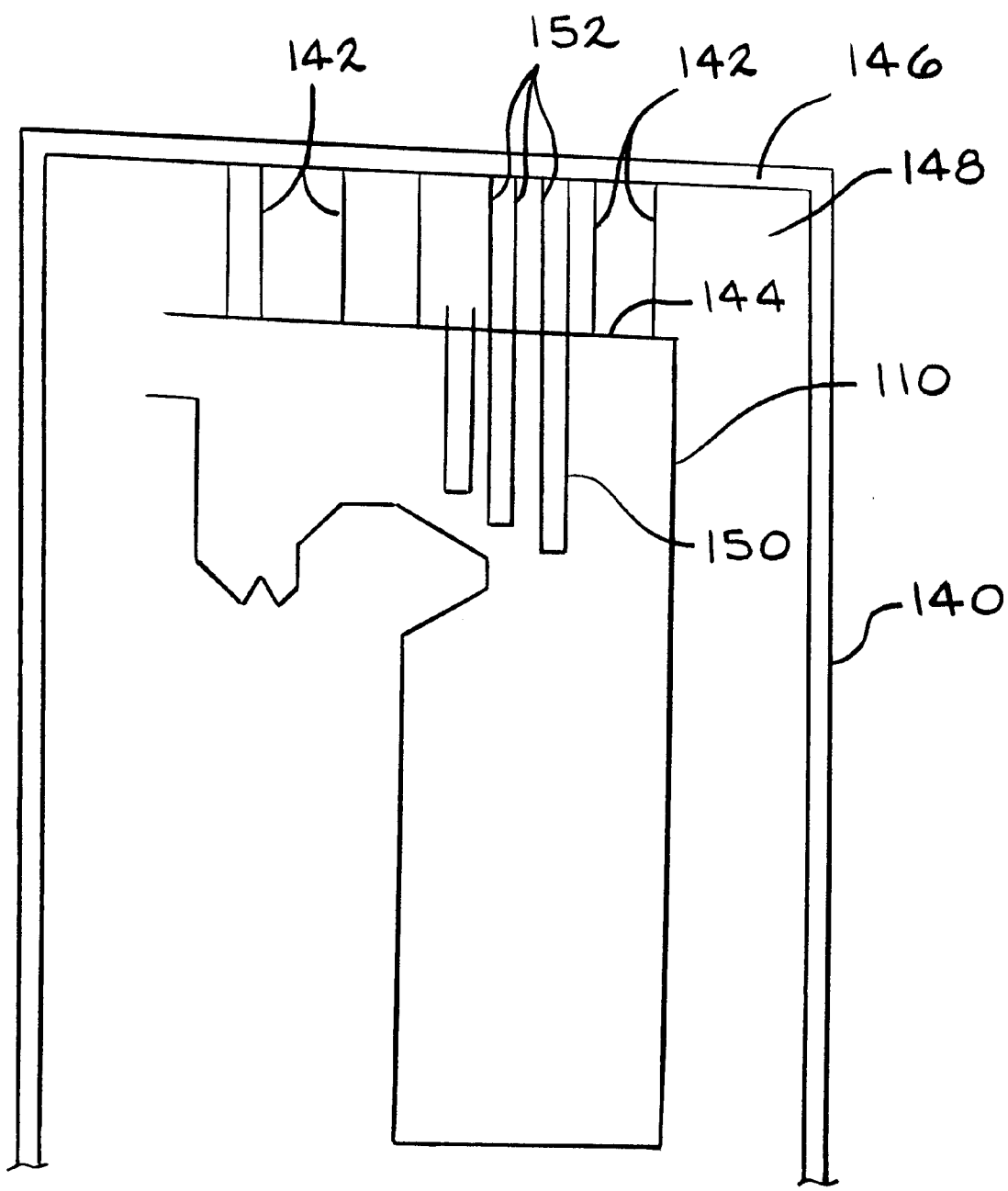
Figure 2A:
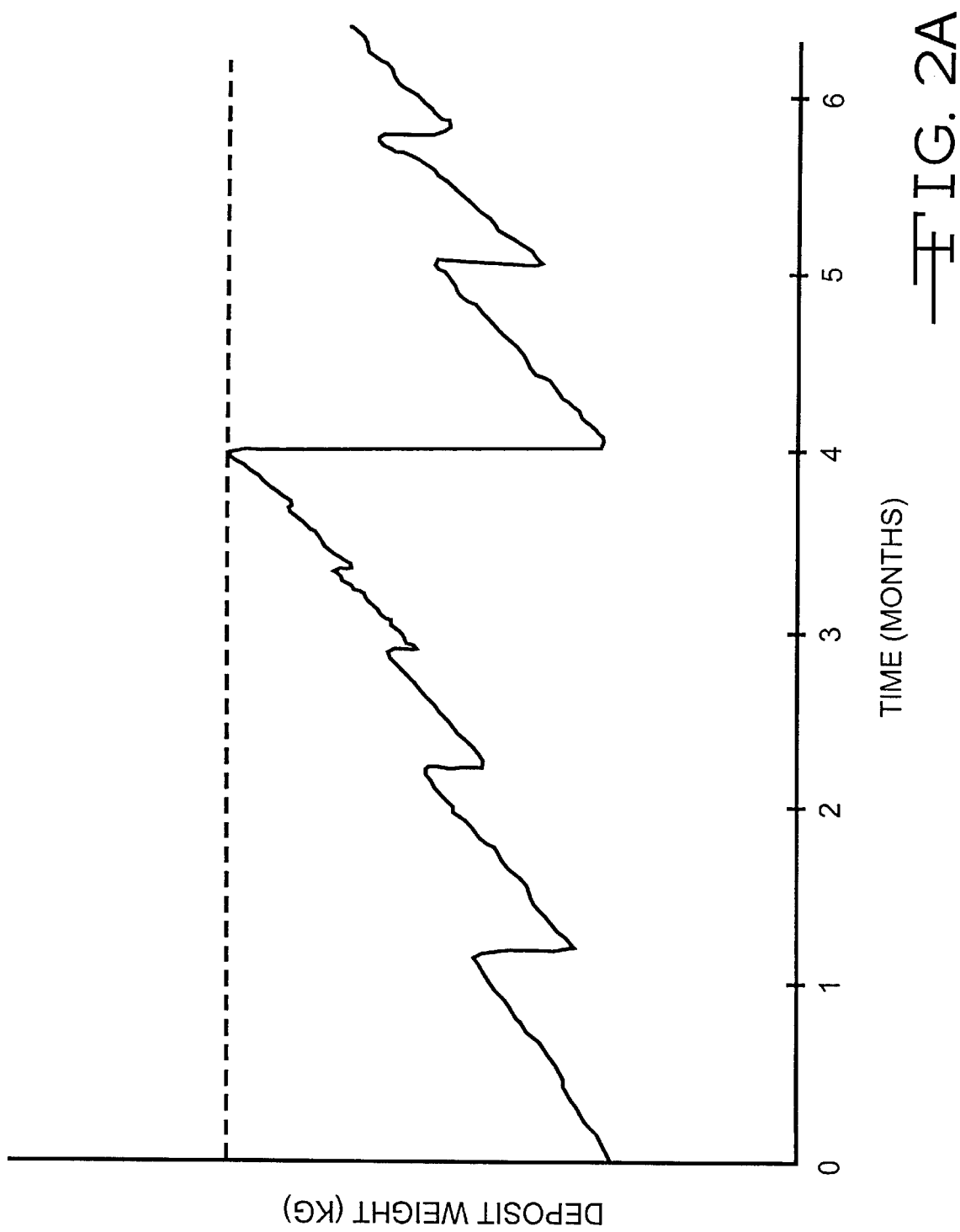
Figure 2B:
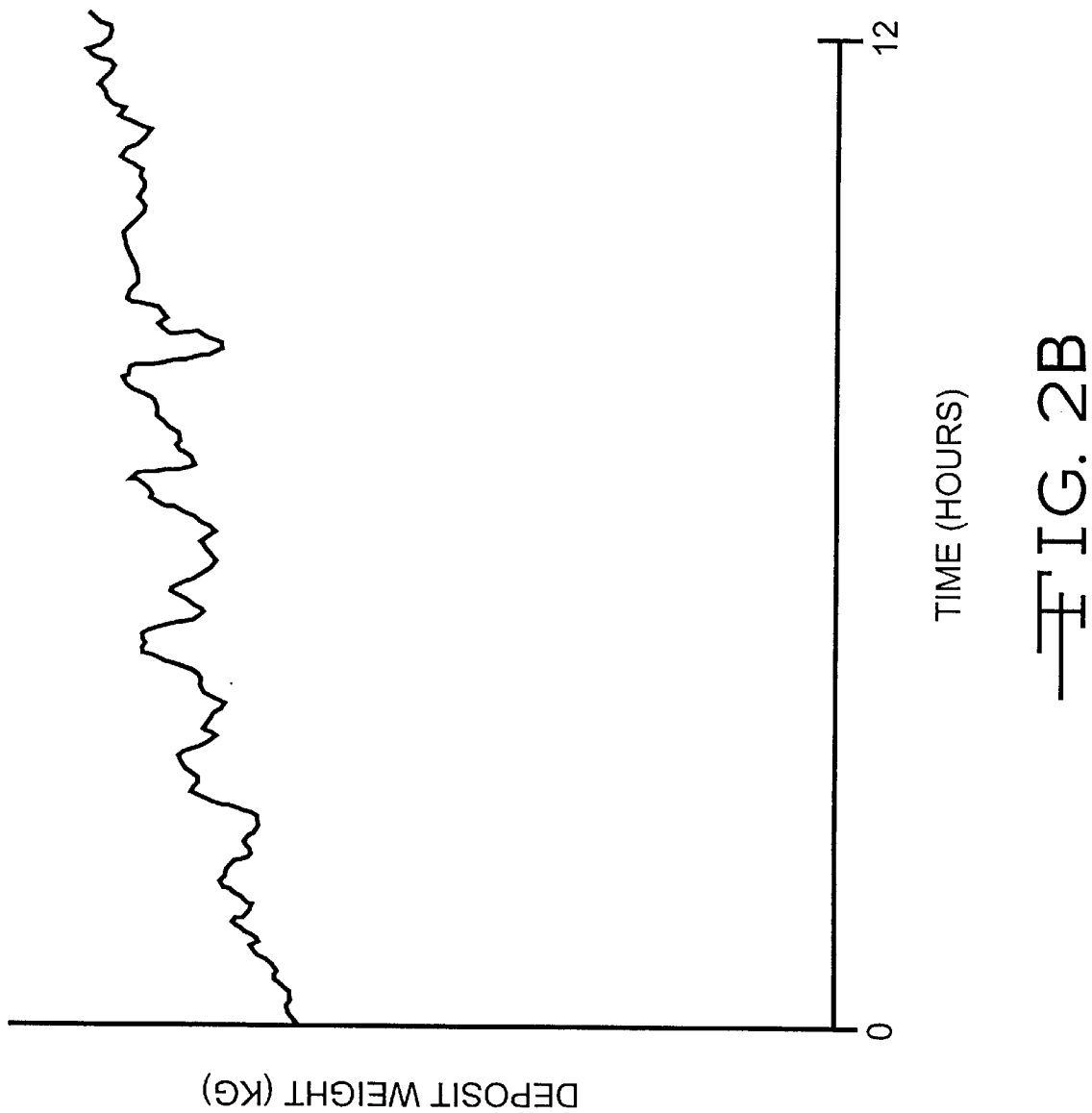

The structure, operation, and advantages of the invention will become further apparent upon consideration of the following description taken in conjunction with the accompanying drawings, wherein:

FIG. 1A diagrammatically shows the components of a typical kraft black liquor recovery boiler system;

FIG. 1B diagrammatically illustrates how the recovery boiler is mounted in a steel beam support structure;

FIG. 1C diagrammatically shows some of the components of the superheater system 210;

FIGS. 2A shows a typical graph of superheater deposit weight vs. time, where the deposit weight is determined according to the present invention; and FIG. 2B is an expanded view of a portion of the graph of FIG. 2A.

DETAILED DESCRIPTION OF THE PREFERRED EMBODIMENT

FIG. 1A diagrammatically shows the components of a typical kraft black liquor recovery boiler system 100. Black liquor is a by-product of chemical pulping in the paper-making process. The initial concentration of "weak black liquor" is about 15%. It is concentrated to firing conditions (65% to 85% dry solids content) in an evaporator 120, and then burned in a recovery boiler 110.

The boiler 110 has a furnace section, or "furnace" 112, where the black liquor is burned, and a convective heat transfer section 114, with a bullnose 116 in-between. Combustion converts the black liquor's organic material into gaseous products in a series of processes involving drying, devolatilizing (pyrolyzing, molecular cracking), and char burning/gasification. Some of the liquid organics are burned to a solid carbon particulate called char. Burning of the char occurs largely on a char bed 118 which covers the floor of the furnace 112, though some char burns in flight. As carbon in the char is gasified or burned, the inorganic compounds in the char are released and form a molten salt mixture called smelt, which flows to the bottom of the char bed 118, and is continously tapped from the furnace 112 through smelt spouts 122. Exhaust gases are filtered through an electrostatic precipitator 124, and exit through a stack 125.

The vertical walls 126 of the furnace are lined with vertically aligned wall tubes 127, through which water is evaporated from the heat of the furnace 112. The furnace 112 has primary level air ports 128, secondary level air ports 130, and tertiary level air ports 132 for introducing air for combustion at three different height levels. Black liquor is sprayed into the furnace 112 out of black liquor guns 134.

The heat transfer section 114 contains the following three sets of tube banks (heat traps) which successively, in stages, heat the feedwater to superheated steam: 1) an economizer 136, in which the feedwater is heated to just below its boiling point, 2) the boiler bank 138 (or "steam generating bank"), in which, along with the wall tubes 127, the water is evaporated to steam, and 3) a superheater system 150, which increases the steam temperature from saturation to the final superheat temperature.

FIG. 1B diagrammatically illustrates how the recovery boiler 110 is mounted in a steel beam support structure 140, showing only the boiler's profile and components that are of current interest. The entire recovery boiler 110 is suspended in the middle of the support structure 140 by boiler hanger rods 142. The boiler hanger rods 142 are connected between the roof 144 of the boiler 110 and the overhead beams 146 of the support structure 140. Another set of hanger rods, hereinafter called "superheater hanger rods" or simply "hanger rods"152, suspend only the superheater system 150. That is, the superheater system 150 is suspended independently from the rest of the boiler 110. The open-air area between the boiler roof 144 and the overhead beams 146 is called the penthouse 148.

FIG. 1C diagrammatically illustrates some of the components of the superheater system 150 which are independently suspended within the boiler 110. The superheater system 150 in this embodiment has three superheaters 154,155,156. While three superheaters are shown, it is within the scope of the invention to incorporate more superheaters as needed. For clarity, the following discussion describes the construction of superheater 154 or speaks in terms of superheater 154, with the understanding that the construction of the other superheaters 155,156 is the same.

Each superheater 154, 155,156 has typically 20–50 platens 158. Steam enters the platens 158 through a manifold tube called an inlet header 160, is superheated within the platens, and exits the platens as superheated steam through another manifold tube called an outlet header 162. The platens 158 are suspended from the headers 160,162, which are themselves suspended from the overhead beams 146 (FIG. 1B) by hanger rods 152. Typically 10–20 hanger rods 152 are evenly spaced along the length of each header 160,162, affixed by conventional means, such as welding, to the header below and to the overhead beam 146 above, as described below. The superheater 154 has typically 20 hanger rods 152 —10 hanger rods for the inlet header 160 and 10 hanger rods for the outlet header 162. Each hanger rod 152 has a threaded top around which a tension nut is turned to adjust the rod's tension. The tension of each hanger rod 152 is adjusted typically after every 1–3 waterwashings to keep the tension uniform (balanced) among all the hanger rods of a single superheater 154.

When clean (just after thorough waterwashing), each superheater 154 weighs typically 5000 kg, and each superheater hanger rod 152 carries a load of typically 5000 kg . Subsequently, just before the next waterwashing is needed, deposits (fouling) add an additional weight on each superheater 154 of typically 2000 kg, resulting in an additional load on each hanger rod 152 of typically 2000 kg, resulting in an additional strain on each hanger rod of typically $5.0 \times 10^{-5}$ cm/cm, which is measurable by commonly available methods, such as with a conventional strain gage 166.

The strain (after zeroing off the strain that was read just after the previous washdown), summed over all the hanger rods 152 suspending a superheater 154, is proportional to the weight of the deposit on that superheater. Each additional kg of deposit yields an additional strain of typically $2.0 \times 10^{-8}$ cm/cm, which is measurable by conventional strain sensors, such as strain gages 166. Hence, the weight of the deposit on each superheater 154 can be directly determined by measuring the strain on its corresponding hanger rods 152.

A typical system for determining deposit weight on a single superheater 154 might comprise twenty (20) strain gages 166 affixed to the twenty (20) hanger rods 152, respectively, of the superheater, a computer having data acquisition capability (not shown) connected to the 60 strain gages, and a computer program. Under the program's control, the computer periodically (typically every minute) records strain readings from the 20 strain gages 166 (from each superheater 154,155,156), calculates the sum of the strain readings, subtracts the sum of the strain readings taken just after a previous washdown, and then multiplies the result by a calibration factor to yield the current deposit weight. In equation form, the formula is:

Deposit weight=(Sum of strain gage readings currently–Sum of strain gage readings just after a previous washdown)×calibration factor;

or, equivalently stated:

Deposit weight=(ΣSt−ΣSo)×C, where

ΣSt=Sum of strain gage readings at any time t

ΣSo=Sum of strain gage readings just after a previous washdown, considered as at time zero.

C=calibration constant to convert strain to weight

The system according to the present embodiment has been built and installed in an actual kraft recovery boiler, to measure and graph deposit weight vs. time for each superheater in a boiler. Graph 200, as shown in FIGS. 2A and 2B, is based on, and is typical of, real-life curves of superheater deposit weight vs. time, where the deposit weight is determined according to the present invention. Graph 281 of FIG. 2B is an expanded view of a portion of the graph 280 in FIG. 2A.

The small dips 282 (FIG. 2B) correspond to the small deposit reduction during the frequent sootblowing performed during boiler operation. The medium dips 284 (FIG. 2A) correspond to the larger deposit reduction during chill-and-blow cleanings. The large dip 286 corresponds to a thorough waterwashing during complete boiler shutdown. The "waterwash threshold weight" level is indicated by dashed line 288. Graph 280 illustrates that, as the deposit grows, the chill-and-blow procedure becomes gradually less effective and must be performed more often, until the graph reaches the waterwash threshold weight level 288, at which point the superheater 254 is due for a complete shutdown and waterwashing.

A more useful and meaningful value than deposit weight for a boiler operator is a "waterwash index", determined separately for each superheater 154,155,156, which is a measure of how far along the superheater is to needing a complete shutdown and waterwashing, from 0 to 1, where "0" indicates the superheater is clean, "1"indicates the superheater needs a waterwashing, and a value greater than "1"indicates the superheater is past due for a waterwashing. The waterwash index is calculated as the current deposit weight on the superheater in question divided by the "waterwash threshold weight". The "waterwash threshold weight" is the empirically determined weight the deposit should be at the optimum time for waterwashing. Even if the operator does not waterwash the boiler when the waterwash index reaches "1", just knowing the waterwash index enables the operator to make informed boiler maintenance decisions.

The aforementioned waterwash index is useful for the majority of boilers that require a waterwash 2–5 times per year. However, some boilers operate an entire year without requiring waterwashing, because their chill-and-wash cleanings are timed and performed so optimally that the deposit never reaches a waterwash threshold weight. For such boilers, a more useful value for the boiler operator than the waterwash index is a "chill-and-blow index" which is a measure of how far along the platen is to needing a chill-and-blow cleaning, from 0 to 1, where "0" indicates the platen is clean, "1" indicates the platen needs a chill-and-blow cleaning, and a value greater than "1" indicates the platen is past due for a chill-and-blow cleaning. The chill-and-blow index is calculated as the current deposit weight on the superheater in question divided by the "chill-and-blow threshold weight", where the "chill-and-blow threshold weight" is the empirically determined weight the deposit should be at the optimum time for chill-and-blow cleaning.

The chill-and-blow index and the waterwash index are both considered "cleaning indexes". A boiler operator would use either cleaning index appropriate for his boiler but not both cleaning indexes.

The three values —deposit weight, chill-and-blow index and waterwashing index —are considered "state values" because they describe the current state of the deposit. The computer can calculate the rate of change (first differential) of the state values over some unit of time (such as per hour). These rate values can be used in conjunction with the state values to predict when a cleaning will be necessary. For example, if the chill-and-blow index is currently 0.8 and its rate of increase is 0.1 per week, then the superheater will probably need a chill-and-blow cleaning in two weeks (when the chill-and-blow index should reach 1.0). During a chill-and-blow cleaning, if the chill-and-blow index is currently 0.8 and its rate of decrease is 0.1 per hour, and the operator is aiming to reduce the chill-and-blow index to 0.6, then he can predict the superheater will need two more hours of cleaning.

For more accurate predictions, the computer can calculate the second differential (rate of change of rate of change) of a state value (such as chill-and-blow index). Taking into account a cleaning index and its first and second differentials can enable the operator to predict very accurately when the cleaning is due to start and (during cleaning) when the cleaning is due to end.

In the current embodiment, strain gages 166 are connected to all of the hanger rods 152 of all of the platens 258 in the boiler 110, within the open-air penthouse 148 as far as possible from hot surfaces to avoid temperature effects, and the computer is connected to, and monitors, all of the strain gages. The computer performs the aforementioned strain gage readings and computations for all three superheaters 154,155,156. The computer displays to the operator both the deposit weight and the appropriate cleaning index and their first and second differentials, for each superheater 154,155, 156.

These simple-to-understand parameters (the state parameters and their first and second differentials), displayed to the operator, inform him if a cleaning is due or when to expect it will be due. Also, as the operator adjusts boiler parameters (for example, to increase boiler throughput), these simple-to-understand parameters enable him to understand how those adjustments affect the deposit rate and cleaning schedule. Also, even during cleaning (whether sootblowing or washdown), when the boiler 110 is partially or completely shut down for cleaning, these simple-to-understand parameters inform the operator how effectively the deposit is being removed to enable him to fine tune the cleaning procedure. For example, the operator can use the aforementioned state and rate-of-change parameters to empirically determine the optimum sootblower sequence or the most effective sootblowers or the most effective method to clean the boiler 110.

Although the present embodiment employs a computer, any logic circuit may be used, such as a PLC (programmable logic controller).

Although the present embodiment employs strain gages 166 on all hanger rods 152, it is within the scope of the present invention to employ a strain gage on each of only a few representative hanger rods of a superheater 154,155, 156. This yields an accurate determination of deposit weight if the deposit is uniformly deposited on each platen 158 and the tension of the hanger rods 152 has been balanced using the tension nuts (mentioned above).

Since, in general, strain gages are notoriously sensitive to temperature fluctuations, it is advisable to affix a temperature sensor next to each strain gage 166, with all temperature sensors interfaced to the computer, to correct each strain gage reading for temperature effects (temperature coefficient error) as is common practice when using strain gages. Alternatively, fewer temperature sensors can be employed next to a few representative strain gages 166 if it has been found that the temperature at those representative strain gages is the same, or at least a known function of, the temperature at the other strain gages.

Although the present embodiment entails determining deposits on superheaters 154,155,156 of a kraft recovery boiler 110, this invention can be applied to other boilers and to other independently suspended components than superheaters.

The advantages of the present invention over the prior art techniques of measuring temperature and heat transfer rate (which is itself a temperature-related parameter) are as follows: 1) Temperature measurement requires the use of thermocouples, infrared probes or acoustic pyrometry, which require the use of expensive and/or delicate equipment and can require recalibration, whereas strain gages used according to the present invention have long operating lives and no need for recalibration. 2) Temperature-based techniques are affected by boiler load, and mathematical corrections for this cannot precisely correct the error, whereas the method of the present invention is not affected by boiler load. 3) Temperature based techniques cannot be used when the boiler is partially or fully shut down for cleaning, whereas the method of the present invention can. 4) Temperature-based techniques require complex formulas and parameters that are difficult for a common boiler operator to perform and interpret, whereas the formulas and parameters of the present invention are simple to perform and interpret.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A system for measuring a weight of a deposit that forms on a tube bank independently-suspended by one or more hanger rods within a boiler;

the system characterized by:

one or more strain sensors, each strain sensor affixed to a separate hanger rod; and the strain sensors connected to logic circuit means for reading strain readings from the strain sensors and calculating the weight of the deposit as a function of the strain readings.

2. The system of claim 1 where the strain sensors are strain gages.

3. The system of claim 1 further including one or more temperature sensors, each temperature sensor affixed to a hanger rod close to a strain sensor and electrically connected to the logic circuit means whereby the logic circuit means uses temperature readings from the one or more temperature sensors for mathematically correcting the strain readings for temperature effects.

4. The system of claim 1 in which the logic circuit means further calculates the weight of the deposit as the sum of the strain readings currently obtained from the strain sensors minus the sum of the strain readings obtained from the strain sensors just after a previous washdown, all multiplied by a calibration factor.

5. The system of claim 1 in which the logic circuit means calculates a cleaning index which equals the weight of the deposit divided by a predetermined threshold weight.

6. The system of claim 1 in which the logic circuit means displays the weight of the deposit.

7. The system of claim 5 in which the logic circuit means displays the weight of the deposit and the cleaning index.

8. The system of claim 1 in which the boiler is a kraft recovery boiler.

9. The system of claim 1 in which the number of strain sensors is less than the number of hanger rods.

10. A method for measuring a weight of a deposit that forms on a tube bank independently-suspended by one or more hanger rods within a boiler;

the method characterized by the steps of:

acquiring strain readings by a logic circuit from one or more strain sensors each affixed to a separate hanger rod; and calculating the weight of the deposit as a function of the strain readings.

11. The method of claim 10 wherein the step of calculating the weight of the deposit is performed by the logic circuit.

12. The method of claim 10 further including the steps of:

acquiring temperature readings by the logic circuit from the one or more temperature sensors each affixed to a separate hanger rod adjacent to one of the one or more strain sensors; and mathematically correcting the strain readings for temperature effects.

13. The method of claim 12 wherein the step of mathematically correcting the strain readings for temperature effects is by the logic circuit.

14. The method of claim 10 wherein the step of calculating includes calculating the weight of the deposit as the sum of the strain readings acquired from the strain sensors minus the sum of previous strain readings acquired from the strain sensors just after a washdown of the tube bank, all multiplied by a calibration factor.

15. The method of claim 10 including the step of calculating a cleaning index which equals the weight of the deposit divided by a predetermined threshold weight.

16. The method of claim 10 wherein the number of strain sensors is less than the number of hanger rods.

* * * * *